US009469409B2

(12) United States Patent
Peyruseigt et al.

(10) Patent No.: US 9,469,409 B2
(45) Date of Patent: Oct. 18, 2016

(54) AERODYNAMIC FAIRING DIVIDED INTO SUB-PORTIONS

(71) Applicant: Airbus Operations (SAS), Toulouse (FR)

(72) Inventors: Francois Peyruseigt, Toulouse (FR); Thierry Gaches, Castelnau d'Estrefonds (FR); Mathieu Kaleta, Toulouse (FR); Nicolas Voyer, Toulouse (FR); Delphine Chamaillard, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 186 days.

(21) Appl. No.: 14/501,910

(22) Filed: Sep. 30, 2014

(65) Prior Publication Data

US 2015/0144732 A1    May 28, 2015

(30) Foreign Application Priority Data

Nov. 25, 2013   (FR) ..................................... 13 61556

(51) Int. Cl.
| | |
|---|---|
| *B64D 29/06* | (2006.01) |
| *B64D 29/00* | (2006.01) |
| *B64C 1/00* | (2006.01) |
| *B64D 27/26* | (2006.01) |
| *B64D 29/02* | (2006.01) |
| *B64C 7/02* | (2006.01) |

(52) U.S. Cl.
CPC .............. *B64D 29/00* (2013.01); *B64C 1/0009* (2013.01); *B64C 7/02* (2013.01); *B64D 27/26* (2013.01); *B64D 29/02* (2013.01); *B64D 29/06* (2013.01)

(58) Field of Classification Search
CPC ................................ B64D 27/26; B64D 29/06
USPC .......................................................... 244/54
See application file for complete search history.

(56) References Cited

U.S. PATENT DOCUMENTS

| | | | | |
|---|---|---|---|---|
| 4,712,750 A | * | 12/1987 | Ridgwell .................. | B64C 7/02 244/117 A |
| 7,931,232 B2 | * | 4/2011 | Bernardi ................ | B64D 27/18 244/54 |
| 8,118,252 B2 | * | 2/2012 | Dumont ................. | B64D 33/04 244/130 |
| 8,607,453 B2 | * | 12/2013 | Machado .................. | B64C 7/02 244/131 |
| 8,662,440 B2 | * | 3/2014 | Journade ................ | B64D 33/04 244/121 |
| 8,800,917 B2 | | 8/2014 | Machado et al. | |
| 8,955,796 B2 | * | 2/2015 | Raison ................... | B64D 29/02 244/53 R |

FOREIGN PATENT DOCUMENTS

| | | |
|---|---|---|
| EP | 2597039 | 5/2013 |
| FR | 2960519 | 12/2011 |

OTHER PUBLICATIONS

French Search Report, Jun. 27, 2014.

* cited by examiner

*Primary Examiner* — Brian M O'Hara
*Assistant Examiner* — Keith L Dixon
(74) *Attorney, Agent, or Firm* — Greer, Burns & Crain, Ltd.

(57) ABSTRACT

An aerodynamic fairing including at least one sub-assembly, each sub-assembly having a frame which is orientated transversely relative to the longitudinal axis of the fairing and a floor portion which is provided with an inner face, via which the floor portion is fixed to the frame. The fairing further comprises lateral panels which are fixed to the frame and which each extend substantially along the longitudinal axis of the fairing at one side and the other of a plane of symmetry of the fairing. The floor portions of the sub-assemblies are not mechanically connected to each other via rigid connections. The division of the floor into separate portions allows a reduction in the longitudinal thermomechanical stresses applied by the expansion of the floor under the action of the primary hot flow of the turbo reactor.

8 Claims, 4 Drawing Sheets

AERODYNAMIC FAIRING DIVIDED INTO SUB-PORTIONS

CROSS-REFERENCES TO RELATED APPLICATIONS

This application claims the benefit of the French patent application No. 1361556 filed on Nov. 25, 2014, the entire disclosures of which are incorporated herein by way of reference.

BACKGROUND OF THE INVENTION

The present invention relates to an aerodynamic fairing of the rear portion of an aircraft pylon which is also referred to as an "aft pylon fairing" or APF.

Such an aerodynamic fairing is known in particular from the U.S. Pat. No. 4,712,750. In this document, the aerodynamic fairing is in the form of a casing which comprises two lateral panels which are assembled together by means of frames or transverse inner reinforcement ribs which are spaced apart from each other along the longitudinal axis of the fairing, and a thermal protection floor which is fixed, on the one hand, to the lateral panels and, on the other hand, to the transverse inner ribs with which the floor is in contact.

In a position for use, such a fairing is subjected to very high temperatures which originate from the engine unit of the aircraft. These temperatures bring about deformations as a result of thermal expansions of the fairing, thus disrupting the aerodynamic qualities thereof In particular, the thermal protection floor is subjected to a primary flow of the turbo engine at high temperature (in the order of 600° C.) whilst the lateral panels are subjected to a secondary flow of the turbo engine at a relatively low temperature (in the order of 150° C.) in relation to that of the primary flow. These temperature differences bring about significant thermomechanical stresses on the casing, which may cause it to become deformed in the long term.

SUMMARY OF THE INVENTION

An object of the invention is to at least partially overcome this disadvantage. The subject matter of the invention is thus an aerodynamic fairing of a pylon of a turbo engine, the fairing being in the form of an open casing which extends along a longitudinal axis and which comprises a first lateral panel and a second lateral panel which are substantially parallel with the longitudinal axis and which are distributed at one side and the other of a plane of symmetry of the fairing, the aerodynamic fairing comprising at least two sub-assemblies which are arranged consecutively (one after the other) along the longitudinal axis and which are separated from each other by means of a gap, each sub-assembly comprising a frame which is orientated transversely relative to the longitudinal axis and a floor portion which extends along the longitudinal axis, each frame having, in a position for use, an upper edge which is fixed to the pylon, a lower edge which is fixed to an inner face of the floor portion of the sub-assembly, and a first lateral edge and a second lateral edge to which the first lateral panel and the second lateral panel are fixed, respectively.

According to an aspect of the invention, two floor portions which are directly adjacent or consecutive along the longitudinal axis are spaced apart by a distance of between 0.1 mm and 5 cm (these two values being inclusive).

Advantageously, a plate is fixed at the inner face of a floor portion of a first sub-assembly, the plate covering a gap between the first sub-assembly and a second sub-assembly which is directly adjacent or consecutive to the first sub-assembly.

Advantageously, each lateral panel is formed by a plurality of lateral panel portions which are fixedly joined to each other.

Preferably, at least one floor portion comprises a reinforcement member which extends transversely to the longitudinal axis.

Other advantages and features of the invention will be appreciated from the non-limiting detailed description set out below.

BRIEF DESCRIPTION OF THE DRAWINGS

This description will be given with reference to the appended drawings, in which.

DETAILED DESCRIPTION OF THE PREFERRED EMBODIMENTS

Figure 1:
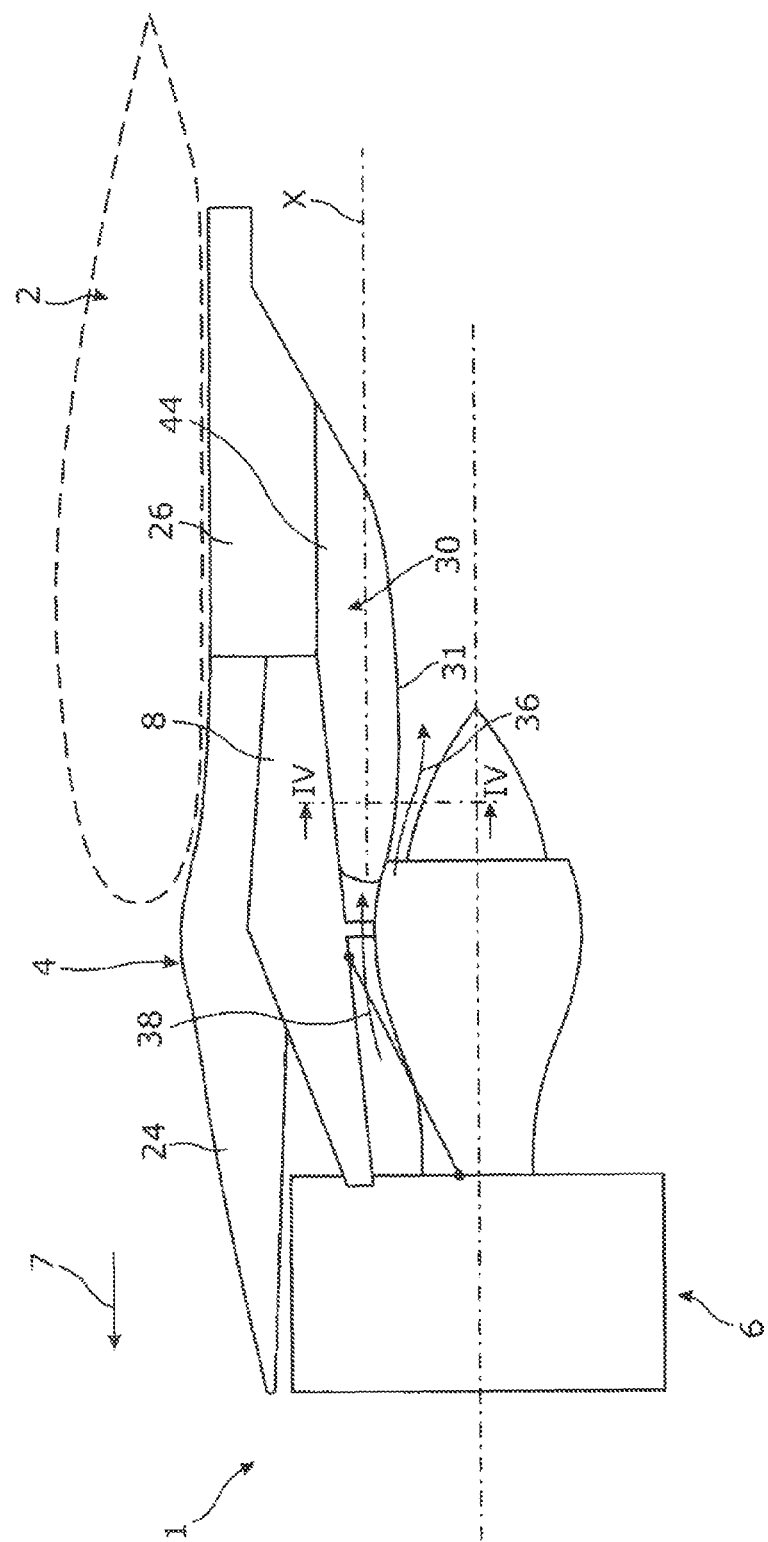
FIG. 1 is a schematic side view of a wing which is provided with an engine pylon and an aerodynamic fairing which is located at the rear portion of the engine pylon and which protects the wing from the hot gases which are discharged by the engine unit.

With reference to FIG. 1, an engine unit 1 which is fixed below a wing 2 of an aircraft is illustrated. The engine unit comprises a pylon 4 and a turbo engine 6, for example, a turbo reactor, which is secured to the wing 2 via the pylon 4. The pylon 4 comprises in known manner a rigid structure 8, which is also called a primary structure, which allows the turbo reactor 6 to be supported via a known arrangement.

Furthermore, the pylon 4 comprises secondary structures of the fairing type. The secondary structures of the pylon 4 include in particular a front aerodynamic structure 24, a rear aerodynamic structure 26, and a rear aerodynamic fairing 30, which is also called an APF or thermal shield. The terms "front" and "rear" are intended to be considered relative to a direction of advance of the aircraft encountered following the thrust applied by the turbo reactor 6, this direction being illustrated schematically by the arrow 7.

Conventionally, the longitudinal axis of the rear aerodynamic fairing 30 is called X. On the other hand, Y is used to refer to the axis which is orientated transversely relative to the turbo reactor 6 and the rear aerodynamic fairing, and Z to refer to the vertical axis or height, these three axes X, Y and Z being mutually orthogonal.

Figure 2:
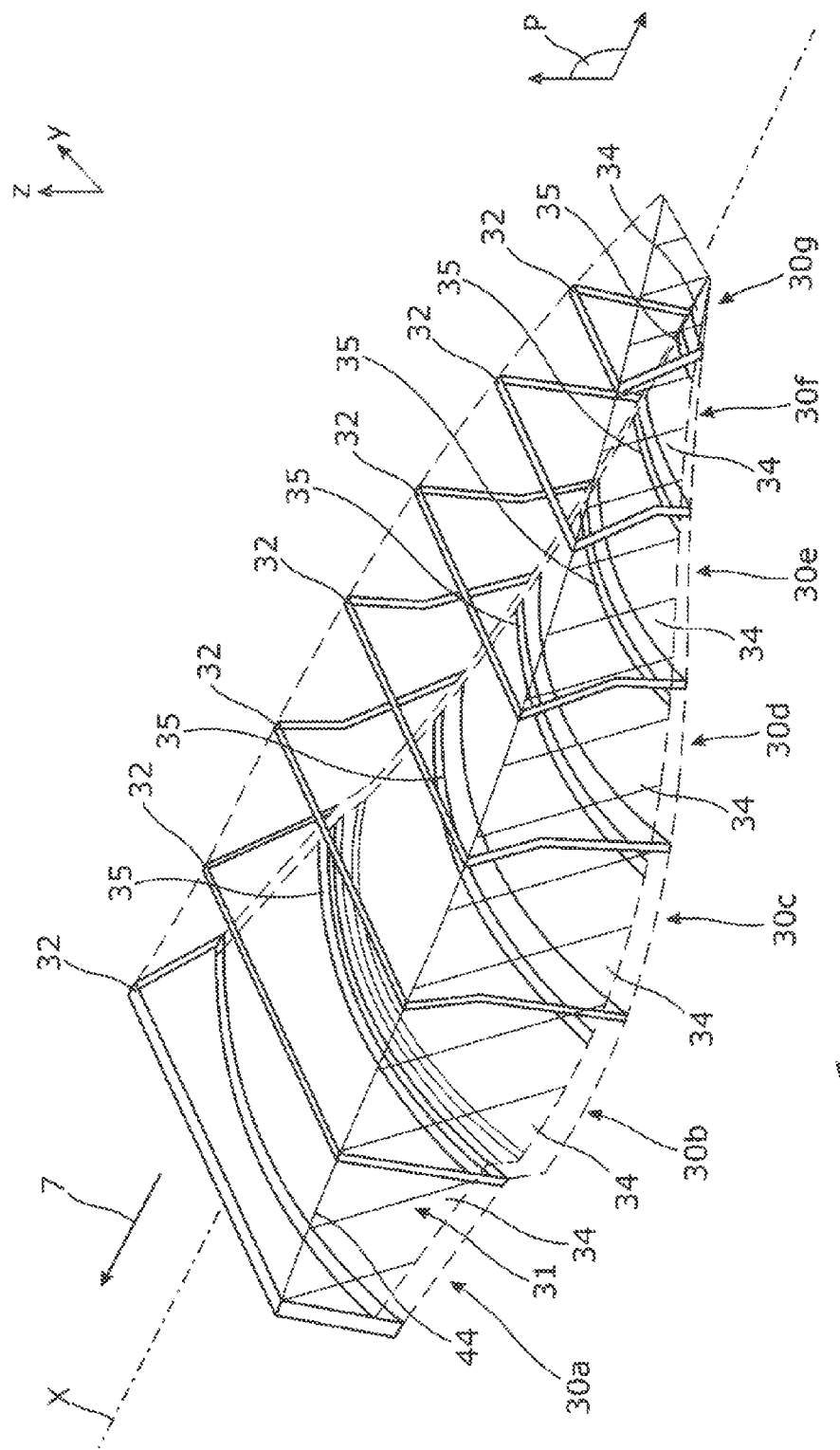
FIG. 2 is a schematic, perspective view of the rear aerodynamic fairing according to an embodiment of the invention illustrated in FIG. 1 in which the rear aerodynamic fairing is formed by a plurality of sub-assemblies.

As illustrated in FIG. 2, the rear aerodynamic fairing 30 is generally in the form of a casing which is open, for example, in an upward direction and which comprises in particular a floor 31 which extends along the longitudinal axis X and two lateral panels which are spaced apart and parallel with each other and which form the two lateral sides (along the longitudinal axis X) of the casing.

According to an aspect of the invention, the rear aerodynamic fairing 30 is formed by at least two sub-assemblies which are adjacent or consecutive in the longitudinal direction X. In the example illustrated in FIG. 2, the rear aerodynamic fairing comprises seven sub-assemblies 30a to 30g. Each sub-assembly comprises a floor portion 34 and a frame 32. There are as many separate sub-assemblies as required in order to form the rear aerodynamic fairing 30 in accordance with desired dimensions, the different floor portions 34 being successive along the axis X which forms the floor 31 of the casing. According to an aspect of the invention, two adjacent or consecutive sub-assemblies are separated from each other by a gap 35 (illustrated by thin lines in FIGS. 2 and 3 for greater clarity, between two floor portions 34 which are directly adjacent or consecutive along the longitudinal axis X) having a dimension along the axis X of between 0.1 mm and 5 cm (these two values being inclusive).

It should be noted that, as illustrated in FIG. 2, the rear aerodynamic fairing 30 is not planar in the plane XZ and is substantially in the form of an arrow (whose tip is orientated toward the rear) in the plane XY. This is because the casing is shaped so that the rear aerodynamic fairing 30 is in the form of the pylon 4 to which it is fixed. The rear aerodynamic fairing 30 is closed by a frame at the front end thereof and, at the rear end thereof, it is closed by a floor portion 34 which is inclined in the plane YZ.

Figure 3:
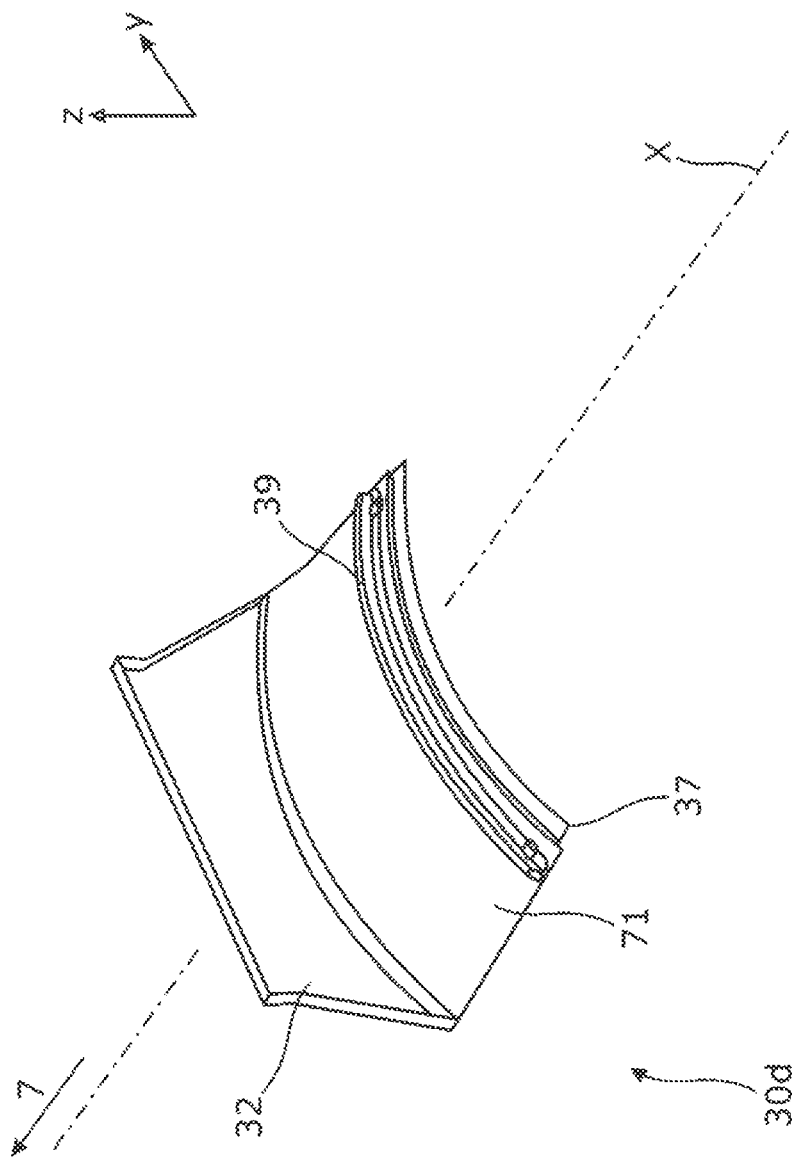
FIG. 3 is a view to a larger scale of a sub-assembly of FIG. 2 according to a production variant of the invention.

With reference to FIG. 3, each floor portion 34 is provided with an inner face 71 and an outer face 70 opposite the inner face 71, the outer face being intended to be followed by the primary flow 36. In order to withstand the thermal stresses, a floor portion 34 is preferably produced from Inconel®, or a titanium alloy.

Figure 4:
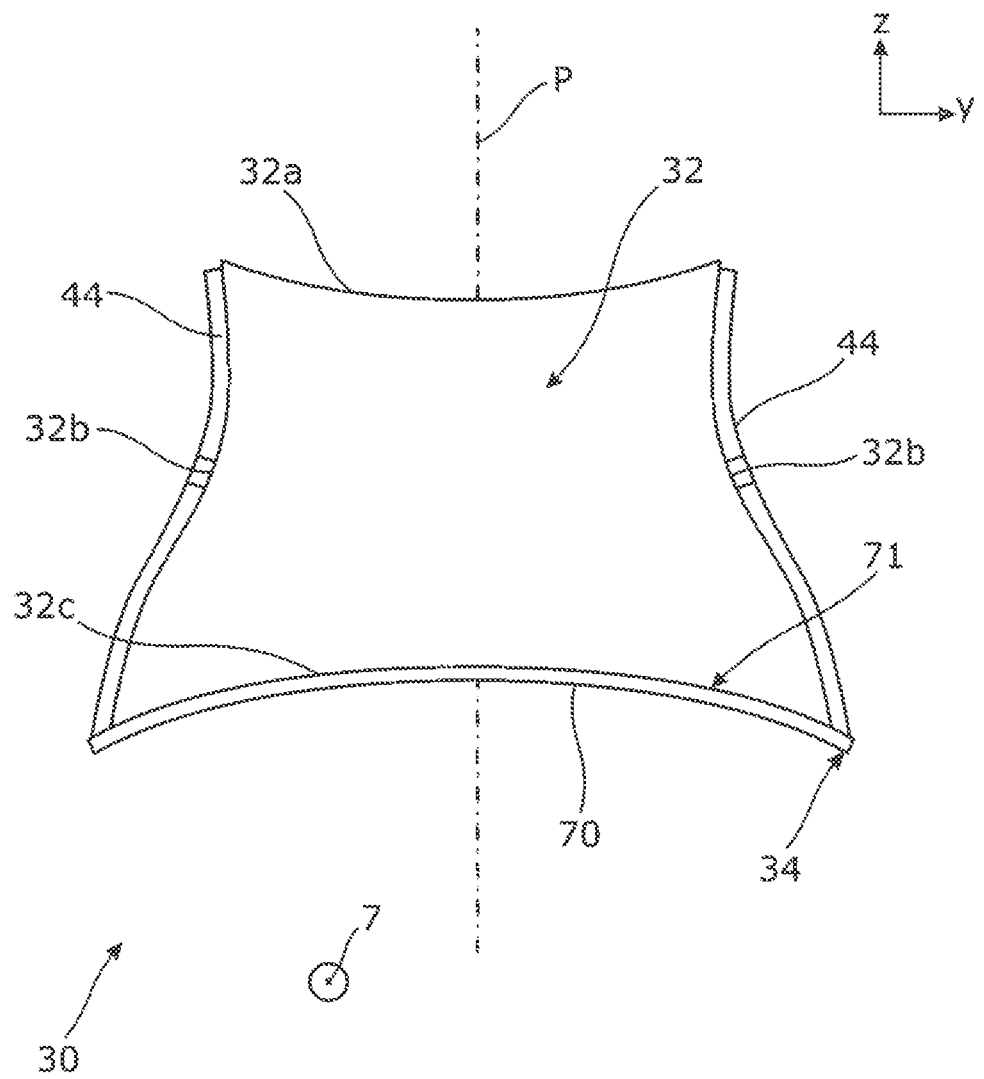
FIG. 4 is a cross section, along line IV-IV, of the aerodynamic fairing illustrated in FIG. 2.

Each frame 32 which is illustrated in greater detail in FIGS. 3 and 4 is in the form of a structural panel which has four edges and which extends in a plane YZ which is transverse relative to the casing. In the example illustrated in the figures appended to the present description, the frame 32 is substantially in the form of an isosceles trapezium in the plane YZ. The two lateral edges 32b of the frame 32 are each intended to receive a lateral panel 44 as will be described in greater detail below. The upper edge 32a of some frames 32 (as in the case where only some frames are fixed to structures of the pylon) or of all the frames 32 (in the case where all the frames are fixed to structures of the pylon) is itself arranged so as to correspond to another structure of the pylon 4 to which it is fixed, that is to say, as in the example illustrated in FIG. 1, the rear aerodynamic structure 26 or the rigid structure 8. The lower edge 32c of the frame of a sub-assembly is fixed to the inner face 71 of the floor portion 34 of this same sub-assembly, for example, by means of splicing connection. The lower edge 32c of the frame 32 corresponds to the floor portion 34 and therefore has, as illustrated in FIG. 4, in a cross section of the rear aerodynamic fairing 30, a curved shape which opens toward the outer side relative to the rear aerodynamic fairing 30. In order to withstand the thermal stresses, a frame 32 is preferably produced from Inconel® or from an equivalent titanium alloy.

With reference more specifically to FIGS. 2 and 4, each lateral panel 44 of the rear aerodynamic fairing 30 extends substantially in the longitudinal plane XZ and the two lateral panels 44 are distributed at one side and the other of a plane of symmetry P of the casing. Each lateral panel 44 is fixedly mounted with respect to the lateral edges 32b (located at the same side of the plane P) of the successive frames 32. The lateral panels 44 are fixed to the frames 32 by means of screwing, optionally complemented by a welding operation. During use, the lateral panels 44 are provided so as to be followed externally by the secondary flow 38.

The lateral panels 44 are, for example, produced from titanium and have a thickness in the order of from 1 mm to 7 mm. In the example illustrated in FIG. 2, the lateral panels 44 extend, each in one piece, from the front to the rear of the rear aerodynamic fairing 30. In this configuration, the panels 44 allow the rear aerodynamic fairing 30 to be reinforced since they are fixed to each of the frames 32 of the fairing 30.

According to an aspect of the invention, the floor portions 34 of the sub-assemblies 30a to 30g are not mechanically connected directly to each other via rigid connections. When the turbo reactor 6 operates, the rear aerodynamic fairing 30 ensures the formation of a thermal barrier which serves to protect the rigid structure 8, the aerodynamic structure 26 and the wing 2 of the aircraft from the heat which is discharged by the primary flow 36, and ensures the formation of thermal continuity between the output of the turbo reactor 6 and the pylon 4.

According to an aspect of the invention, the division of the floor 31 into separate portions 34 allows a reduction in the longitudinal thermomechanical stresses applied by the expansion of the floor 31 under the action of the primary hot flow 36 of the turbo reactor. This is because the floor 31 according to an aspect of the invention has significant mechanical strength because there is a longitudinal mechanical gap between two adjacent or consecutive floor portions 34. Each floor portion 34 therefore has its own thermal expansion which contributes to further reducing the thermomechanical stresses to which the rear aerodynamic fairing 30 is subjected. Since the floor 31 is formed by a plurality of portions 34 along the length thereof, the movements of the portions resulting from the thermal effects are weaker and therefore bring about weaker stresses than in the case of a casing which is formed in one piece.

With reference to FIG. 3, and in a first variant of the embodiment which has been described, a floor portion 34 of a sub-assembly 30a to 30g comprises a reinforcement member 39 which is in the form of a metal profile-member, for example, of titanium, which extends transversely relative to the floor portion 34. The metal profile-member is fixed, for example, by means of screwing, to the inner face 71 of the floor portion 34 in the region of the gap 35 between two sub-assemblies. It should be noted that in FIG. 3 the frame 32 of a floor portion is fixed to the front of the floor portion 34 whilst the reinforcement member 39 is located at the rear of the floor portion 34.

The reinforcement member 39 reinforces the floor portion 34 which is subjected to significant vibration stresses when the turbo engine 6 operates. The reinforcement member 39 also allows the rigidity of the floor portion 34 to be increased in order to better withstand the mechanical stresses. A reinforcement member 39 also confers stability in terms of vibrations on the floor portion 34 to which it is fixed. Since a reinforcement member 39 is connected only to a floor portion 34, it follows the expansion thereof without bringing about additional thermomechanical stresses with respect to the rear aerodynamic fairing 30.

Preferably, the reinforcement member 39 extends over the entire width (that is to say, the dimension in the plane YZ) of a floor portion 34 and all the floor portions are provided with such a reinforcement member.

In a second variant of the invention, in order to prevent the primary flow 36 having a very high temperature from rising and propagating in the gaps 35 between two successive floor portions 34 in the longitudinal axis X, the thermal protection floor 31 is made tight via plates 37 (a plate is illustrated in FIG. 3) which are arranged so as to cover the gap 35 between two adjacent or consecutive floor portions 34 in the longitudinal axis X in order to guide the primary flow of air 36 along the external face 70 of the floor portions 34. The plate 37 which covers the gap between two adjacent or consecutive floor portions 34 is, for example, a flexible strip of metal (for example, of Inconel®) which is fixed at the inner face 71, for example, by means of screwing or welding, to a floor portion (the portion which is located foremost in the example described in FIG. 3) and which extends as far as the other floor portion 34 so as to cover the gap between the two adjacent or consecutive floor portions 34. Since the plate is not fixed to the other floor portion 34, the free thermal expansion of the two floor portions 34 is therefore not impeded.

In the figures which are appended to the above description, each frame 32 has been illustrated as being a solid panel. It is self-evident that, without departing from the scope of the present invention, a frame 32 may also have a hollow shape so as to reduce the weight of the rear aerodynamic casing 30 which is provided with such frames.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aerodynamic fairing of a pylon of a turbo engine comprising:
    the fairing being in the form of a casing which extends along a longitudinal axis and which comprises a first lateral panel and a second lateral panel which are substantially parallel with the longitudinal axis and which are distributed at one side and the other of a plane of symmetry of the fairing,
    the aerodynamic fairing comprising at least two sub-assemblies which are arranged consecutively along the longitudinal axis and which are separated from each other by a gap,
    each sub-assembly comprising a frame which is oriented transversely relative to the longitudinal axis and a floor portion which extends along the longitudinal axis, wherein the floor portion of each sub-assembly is not directly connected to the floor portion of the adjacent sub-assembly at an inner face of the floor portions;
    each frame having, in a position for use, an upper edge, a lower edge which is fixed to the inner face of the floor portion of the sub-assembly, and a first lateral edge and a second lateral edge to which the first lateral panel and the second lateral panel are fixed, respectively.

2. The aerodynamic fairing as claimed in claim 1, wherein two floor portions which are directly consecutive along the longitudinal axis are spaced apart by a distance of between 0.1 mm and 5 cm.

3. The aerodynamic fairing as claimed in claim 1, wherein the sub-assembly is a first sub-assembly and a plate is fixed at the inner face of the floor portion of the first sub-assembly, the plate covering a gap between the first sub-assembly and a second sub-assembly which is directly consecutive to the first sub-assembly.

4. The aerodynamic fairing as claimed in claim 1, wherein at least one floor portion comprises a reinforcement member which extends transversely to the longitudinal axis.

5. An aerodynamic fairing of a turbo engine pylon comprising:
    a casing extending along a longitudinal axis and comprising a first lateral panel and a second lateral panel both substantially parallel to the longitudinal axis and being arranged at one side and the other of a plane of symmetry of the fairing,
    at least two sub-assemblies arranged along the longitudinal axis and being separated from each other by a gap,
    each sub-assembly comprising a frame extending transversely relative to the longitudinal axis and a floor portion extending along the longitudinal axis, wherein the floor portion of each sub-assembly is not directly connected to the floor portion of the adjacent sub-assembly at an inner face of the floor portions;
    each frame having, in a position for use, an upper edge, a lower edge fixed to the inner face of the floor portion of the sub-assembly, a first lateral edge to which the first lateral panel is fixed, and a second lateral edge to which the second lateral panel is fixed.

6. The aerodynamic fairing as claimed in claim 5, wherein two floor portions of two sub-assemblies which are directly adjacent along the longitudinal axis are spaced apart by a distance in the range of 0.1 mm to 5 cm.

7. The aerodynamic fairing as claimed in claim 5, wherein the sub-assembly is a first sub-assembly and a plate is fixed at the inner face of the floor portion of the first sub-assembly, the plate covering a gap between the first sub-assembly and a second sub-assembly which is directly adjacent to the first sub-assembly.

8. The aerodynamic fairing as claimed in claim 1, wherein at least one floor portion comprises a reinforcement member extending transversely to the longitudinal axis.

* * * * *